United States Patent [19]

Schleicher et al.

[11] 4,007,022
[45] Feb. 8, 1977

[54] PROCESS FOR THE REMOVAL OF GASEOUS MONOMERS FROM POLYVINYL CHLORIDE-WATER DISPERSIONS

[75] Inventors: Rudolf Schleicher, Hamm, Marl; Juergen Walther; Karl-Heinz Schoenberg, both of Marl; Peter Rauth, Bochum, all of Germany

[73] Assignee: Chemische Werke Huls Aktiengesellschaft, Marl, Germany

[22] Filed: Aug. 28, 1975

[21] Appl. No.: 608,699

[30] Foreign Application Priority Data

Aug. 29, 1974 Germany .......................... 2441304

[52] U.S. Cl. ........................................ 55/41; 55/55
[51] Int. Cl.² ........................................ B01D 19/00
[58] Field of Search ............... 55/41, 52, 55, 193, 55/206; 261/112

[56] References Cited

UNITED STATES PATENTS

| | | | |
|---|---|---|---|
| 1,452,253 | 4/1923 | Nevitt | 55/206 X |
| 2,966,230 | 12/1960 | Cervinka | 55/193 |
| 3,229,449 | 1/1966 | Hogue | 55/193 |
| 3,789,579 | 2/1974 | El-Hindi | 55/55 X |

FOREIGN PATENTS OR APPLICATIONS 624,452  9/1961  Italy ...................................... 55/193

OTHER PUBLICATIONS

Alien Property Custodian, Ser. No. 216,105, Apr. 20, 1943, Guinot.

*Primary Examiner*—Thomas G. Wyse
*Assistant Examiner*—Robert A. Spitzer
*Attorney, Agent, or Firm*—Millen & White

[57] ABSTRACT

A method for removing at least a portion of dissolved gases from a liquid dispersion utilizing a closed, cylindrical tower with an inlet in its upper portion, a tank at the bottom of the tower for collecting liquids, a central pipe in the tower open at each end, the upper end extending above the inlet and the lower end terminating above the level of the collected liquids in the tank and a plurality of inclined surfaces mounted around the central pipe and providing a flow path for the dispersion, each of the plurality of inclined surfaces being shaped and positioned to reverse the direction of flow and dimensioned to form an annular gap between the inclined surfaces and the wall of the tower, the inclined surfaces forming an angle of about 45° to 80° with the central pipe.

4 Claims, 2 Drawing Figures

PROCESS FOR THE REMOVAL OF GASEOUS MONOMERS FROM POLYVINYL CHLORIDE-WATER DISPERSIONS

The process has particular relevance for lowering the content of gaseous monomers in solid-liquid dispersions obtained in the manufacture of polyvinyl chloride wherein a layer of dispersion of about 0.5 – 5 mm thickness is flowed over the inclined surfaces at temperatures of about 30 – 90° C and an absolute pressure of 30 – 700 mbar during a period of 2–30 seconds, and the liberated gaseous monomer is removed directly from the area of the inclined surfaces above the interface between the remaining dispersions and the liberated gas.

During the manufacture of polyvinyl chloride according to the emulsion or suspension method, solid-liquid dispersions are formed which frequently still contain residues of the gaseous monomer dissolved therein. The monomer can, in this connection, be present in dissolved form in the liquid portion as well as in the solid portion of the dispersion.

For reasons of industrial hygiene, it is necessary to remove the gaseous monomer from the dispersion before the further processing operation, without however, allowing same to pass into the environment.

It is known to degasify pure liquids by allowing the liquid to trickle, in a tower, in a thin film over hurdles, packing elements, cascade units, plate installations, bubble trays, screen plates, wire packings, etc., while passing a carrier gas concurrently or countercurrently thereto, this carrier gas entraining the gas to be removed. These processes, however, have the disadvantage that the gas to be removed is obtained in great dilution, so that its recovery is so difficult and expensive that the gas removed in these devices generally must be exhausted into the atmosphere, unless a separate gas purification stage is connected thereafter. Another disadvantage is that the gas to be removed comes repeatedly again into contact with the liquid during its path through the installations. Thereby, the partial pressure of the gas, which is in the gaseous phase, rises in the gas flow direction, since the gas exiting from the liquid is added to the gas already present in the respective tower section. The efficiency of these methods is unsatisfactory, especially if the removal of traces of dissolved gas is involved. The last-mentioned disadvantages also occur in such methods and/or devices suitable for conducting these methods if the residual gas is removed from the liquid without the use of a carrier gas.

Furthermore, arrangements have been conventional wherein the liquid to be degasified flows in half-filled pipes, and the gas emanating from the liquid is withdrawn by suction from the gas space of the respective pipe. The degasification in such devices is only relatively minor, and additionally these devices are totally unsuitable for the treatment of dispersions.

It is an object of the present invention, accordingly, to find a process, by means of which solid-liquid dispersions, obtained during the manufacture of polyvinyl chloride according to the suspension or emulsion process, can be safely freed of dissolved gaseous monomers.

SUMMARY OF THE INVENTION

This object has been attained in accordance with this invention by providing a process for lowering the content of gaseous monomers in solid-liquid dispersions obtained during the manufacture of polyvinyl chloride according to the suspension or emulsion process which is characterized in that the dispersion is allowed to flow in a layer over inclined surfaces forming an angle of 45° to 80° with the vertical at temperatures of 30°–90° C in a vacuum of 30–700 mbar with a layer thickness of 0.5 – 5 mm during a period of 2–20 seconds; and the thus-liberated gaseous monomer is removed directly from the interface between the dispersion and the gas space.

DRAWINGS

This process and the construction and mode of operation of the apparatus for performing the process are described herein below with reference to the drawings, in which.

DESCRIPTION OF THE PREFERRED EMBODIMENT

Figure 1:
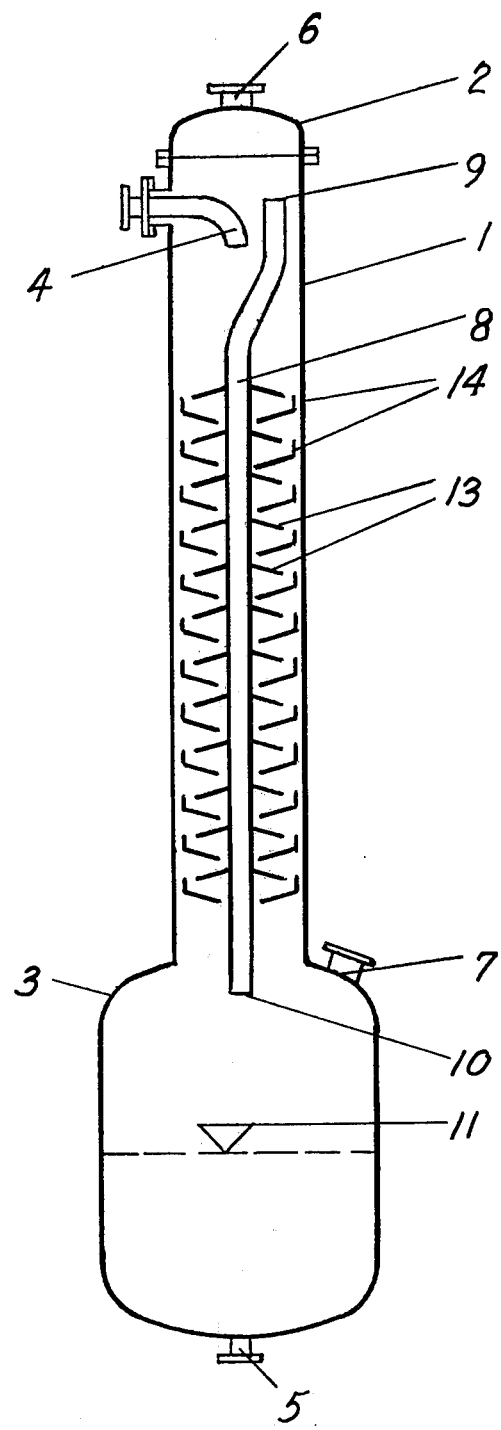
FIG. 1 shows a schematic representation of the apparatus according to the invention.
Figure 2:
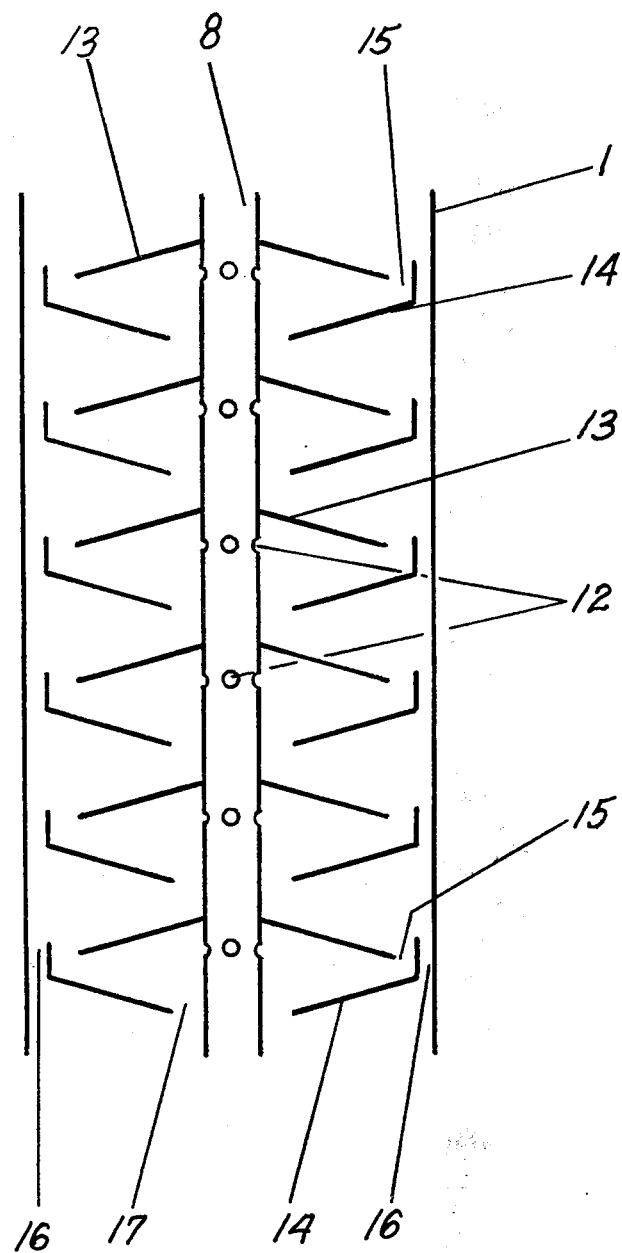
FIG. 2 shows an enlarged fragmentary view of FIG. 1.

The apparatus for performing the process consists of a tower having a cylindrical jacket 1, an upper sealing lid 2, a tower liquid-collecting tank 3, as well as a liquid inlet nipple 4, a liquid outlet nipple 5, and a gas exhaust nipple 6 installed in the upper sealing lid 2. The tower tank furthermore contains the pipe section 7 allowing access to the tank, but this section can also be used as a discharge pipe. A central pipe 8 is installed within the tower, the upper open end 9 of this pipe extending into the head of the tower above the liquid inlet 4 and the lower open end 10 of this pipe extending into the tower tank above the liquid level 11.

Roof-shaped installations 13 and collecting trough-like installations 14 together having the shape of an annular disc are mounted around the central pipe 8. The roof-shaped installations 13 closely adjoin the central pipe, but leave an annular gap 15 toward the collecting trough-like installations. The annular groove-shaped collecting trough 14 forms an annular gap 16 with the jacket 1 and an annular gap 17 with the central pipe 8. The latter furthermore contains openings 12 arranged respectively below the roof-shaped installations.

To ensure a sufficiently satisfactory discharge of the thus-liberated monomer, the central pipe 8 should have a cross-sectional area of 0.8–4% of the cross-sectional area of the tower. In case of dispersions with very low monomer contents, cross-sectional areas below the lower value can be employed successfully. On the other hand, an increase in the cross-sectional area of the central pipe above the upper value does not result in any improvement of the gas removal but rather merely reduces the space available for the remaining installations and thus only diminishes the efficiency of the apparatus.

The openings 12 arranged in the central pipe below the roof-shaped installations 13 are to be large enough to make efficient discharge of the gas possible. The openings 12 should preferably have a cross-sectional area of at least 25% of the cross-sectional area of the central pipe. However, they can also be of any desired larger size, except that they should not be so large that liquid can pass through them into the central pipe. To make it possible for the dispersion to flow uniformly along the installations 13, 14, the latter should form an angle of 45°–80° with the central pipe. If the angle becomes more shallow, there is the danger of a breakup of the dispersion due to an excessively low flow velocity; if the angle becomes larger, the expenditure in structural parts becomes greater due to the greater space requirements, with the efficiency of the apparatus remaining at the same level.

The cross-sectional area formed by the ring gap 16 should be at least 10%, but preferably 17–30% of the cross-sectional area. No substantial improvement in gas removal is observed at higher values.

The mode of operation of the apparatus shown in FIG. 1 is as follows: The dispersion flows through the nipple 4 onto the topmost roof-shaped installation element 13. The amount of the dispersion is dimensioned so that the dispersion flows in a layer thickness of 0.5 – 5 mm. From the roof-shaped installation 13, the dispersion passes to the trough-like installation 14, from there to the next-lower roof-shaped element, and so forth, until the dispersion, after passing the desired number of installations, enters the tower tank. From this space, the dispersion, freed of monomer, can be withdrawn. The thus-liberated monomer is carried away through the central pipe and the gaps directly from the interface area between the dispersion and the gas space, so that, in the immediate vicinity of the dispersion layer, an approximately identical partial pressure of liberated monomer is ambient at any place within the tower.

In order to facilitate the transition of the monomer from the dispersion into the gaseous phase, a vacuum is advantageously utilized. However, the vacuum should not be so high that the dispersion becomes overly concentrated by the evaporation of water. On the other hand, it should be taken into account that the application of a vacuum enhances the degasification step. In general, the use of an absolute pressure of 30–700 mbar proved to be suitable, if temperatures of 30°–90° C are maintained.

The number of required installations 13, 14 is dependent on the layer thickness with which the dispersion flows over the installations; on the angle of the installations 13 with respect to the central pipe and, concomitantly therewith, the residence time on the installations; on the temperature of the dispersion; on the pressure ambient within the apparatus; and on the desired final content of monomer in the thus-treated dispersion. With an increasing layer thickness, the transition of the monomer into the gaseous phase is made more difficult; with the layer thicknesses that are too small, the amount of dispersion put through per unit time is reduced, and furthermore a very low layer thickness can be maintained only with difficulties. Favorable layer thicknesses range between 0.5 and 5 mm. At the indicated vacuum and the indicated layer thicknesses for the dispersion, the latter is normally freed sufficiently (down to about 500 p.p.m.) of the gaseous monomer after 2–20 seconds. With the above-mentioned angle of the installations with the central pipe of about 75°, a tower diameter of about 120 cm, a layer thickness of about 1.0 mm, a temperature of about 50° C and a vacuum of about 150 mbar, it is generally possible to lower the residual monomer content in the dispersion with 34 installations, corresponding to a residence time of about 10 seconds on the installations, to approximately 0.1% by weight of vinyl chloride.

With a lower starting concentration of the dispersion in vinyl chloride, it is of course also possible to reach lower final concentrations during the degasification. It is likewise possible to recycle the dispersion several times through the apparatus of this invention. Thereby, a further lowering of the final content of gaseous monomer is attained.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

From the foregoing description, one skilled in the art can easily ascertain the essential characteristics of this invention, and without departing from the spirit and scope thereof, can make various changes and modifications of the invention to adapt it to various usages and conditions.

EXAMPLE 1

In a tower with an inner diameter of 1184 mm are mounted 34 annular inclined surfaces with a distance of 158.5 mm to one another. The roof shaped installations have a diameter of 1010 mm and form an angle of 75° with the vertical. The trough shaped installations have a diameter of 1120 mm and form also an angle of 75° with the vertical. These installations are mounted on the central pipe whose inner diameter is 158 mm. The central pipe has 68 openings (4 between a roof and a trough shaped installation) with a diameter of 30 mm for removing the liberated gases.

The tower is fed with 20,000 kg/hr of polyvinylchloride-dispersion with a monomer content of 0.63 weight-%. The absolute pressure in the tower is about 385 mbar and the average temperature in the tower is 75° C. Of course the temperature on the top of the tower is somewhat higher and the temperature on the bottom of the tower is somewhat lower due to the evaporization heat. After leaving the tower the monomer content of the dispersion is 0.042 weight-%.

EXAMPLE 2

In this example there was used a tower with an inner diameter of 990 mm with 22 annular inclined surfaces with a distance of 133.9 mm to one another. The roof shaped installations have diameter of 760 mm and form an angle with the vertical of 75°, the trough shaped installations have a diameter of 900 mm and form an angle to the vertical also of 75°. The central pipe on which these installations are mounted has an inner diameter of 99 mm and has 44 openings of 30 mm diameter for removing the gas.

This tower is fed at an absolute pressure of about 370 mbar with 7,200 kg/hr polyvinylchoride-dispersion with a monomer content of 0.63 weight-%. The average temperature in the tower is 74° C. After leaving the tower the monomer content of the dispersion is 0.09 weight-%.

What is claimed is:

1. A process for lowering the gaseous monomer content of solid-liquid dispersions obtained during the manufacture of polyvinyl chloride according to the suspension or emulsion method, comprising the steps of:

flowing the dispersion over a succession of inclined surfaces forming an angle of about 45° to 80° with the vertical at temperatures of about 30°–90° C in a layer thickness of about 0.5 – 5 mm during a period of about 2–20 seconds; collecting the remaining dispersion and the gaseous phase of the monomers liberated by the flowing step; and removing the thus-liberated gaseous monomer directly from the interface between the dispersion and the gaseous phase of the monomers.

2. The process of claim 1, wherein the flowing step includes the step of maintaining an absolute pressure of 30–700 mbar during the flowing step.

3. The process of claim 2, wherein the flowing step includes the step of reversing the direction of flow of the dispersion at each of said succession of inclined surfaces.

4. The process of claim 3, wherein the dispersion is flowed over inclined surfaces forming an angle of about 75° with the vertical at a temperature of about 75° C, at an absolute pressure of about 375 mbar with a layer thickness of about 1.0 mm during a period of about 10 seconds.

* * * * *